United States Patent
Kikuchi et al.

(10) Patent No.: US 8,298,465 B2
(45) Date of Patent: *Oct. 30, 2012

(54) MICROPOROUS FILM AND METHOD FOR PRODUCING THE SAME

(75) Inventors: Kentaro Kikuchi, Tokyo (JP); Hidetoshi Masugi, Tokyo (JP)

(73) Assignee: Asahi Kasei E-Materials Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/056,512

(22) PCT Filed: Jul. 31, 2009

(86) PCT No.: PCT/JP2009/063636
§ 371 (c)(1),
(2), (4) Date: Jan. 28, 2011

(87) PCT Pub. No.: WO2010/013801
PCT Pub. Date: Feb. 4, 2010

(65) Prior Publication Data
US 2011/0166243 A1    Jul. 7, 2011

(30) Foreign Application Priority Data

| Jul. 31, 2008 | (JP) | 2008-198015 |
| Jul. 31, 2008 | (JP) | 2008-198020 |
| Jul. 31, 2008 | (JP) | 2008-198308 |
| Jan. 21, 2009 | (JP) | 2009-011137 |
| Jul. 9, 2009 | (JP) | 2009-162876 |

(51) Int. Cl.
*B29C 55/00* (2006.01)
*C08J 9/00* (2006.01)

(52) U.S. Cl. ......... 264/173.15; 521/50; 521/79; 521/81; 521/134; 521/180; 428/315.5; 264/41

(58) Field of Classification Search .................. 521/134, 521/50, 79, 81, 180; 264/41, 173.15
See application file for complete search history.

(56) References Cited

U.S. PATENT DOCUMENTS

| 5,240,655 A | * | 8/1993 | Troffkin et al. | 264/28 |
| 5,281,491 A | | 1/1994 | Rein et al. | |
| 5,604,284 A | * | 2/1997 | Ueda et al. | 524/434 |
| 5,652,326 A | | 7/1997 | Ueda et al. | |
| 6,627,346 B1 | | 9/2003 | Kinouchi et al. | |
| 2008/0070086 A1 | * | 3/2008 | Fukuchi et al. | 429/33 |
| 2011/0027659 A1 | * | 2/2011 | Kikuchi et al. | 429/253 |

FOREIGN PATENT DOCUMENTS

| JP | 52-30545 | 3/1977 |
| JP | 03-291848 | 12/1991 |
| JP | 05-251069 | 9/1993 |
| JP | 06-256555 | 9/1994 |
| JP | 06-313078 | 11/1994 |
| JP | 08-34872 | 2/1996 |
| JP | 8-100074 A | 4/1996 |
| JP | 2001-038159 A | 2/2001 |
| JP | 2001-135295 | 5/2001 |
| JP | 2004-149637 | 5/2004 |
| JP | 2006-83294 | 3/2006 |
| JP | 2008-144039 | 6/2008 |
| WO | WO2009/122961 A1 | 10/2009 |

OTHER PUBLICATIONS

International Search Report for PCT/JP2009/063636.*
International Preliminary Report on Patentability dated Mar. 17, 2011 issued in corresponding International Application No. PCT/JP2009/063636.
International Search Report from the Japanese Patent Office for International Application No. PCT/JP2009/063636, mailing date Aug. 25, 2009.
Extended Search Report dated Jun. 27, 2011 issued in corresponding European application.

* cited by examiner

*Primary Examiner* — Randy Gulakowski
*Assistant Examiner* — Kara Boyle
(74) *Attorney, Agent, or Firm* — Finnegan, Henderson, Farabow, Garrett & Dunner, L.L.P.

(57) ABSTRACT

Provided is a microporous film which is made of a thermoplastic resin composition comprising (a) 100 parts by mass of a polypropylene resin and (b) 5 to 90 parts by mass of a polyphenylene ether resin, and which has a sea island structure comprising a sea portion comprising the polypropylene resin as a principal component and an island portion comprising the polyphenylene ether resin as a principal component, wherein pores are formed at an interface between the sea portion and the island portion and within the sea portion.

13 Claims, 4 Drawing Sheets

(A)

(B)

(C)

MICROPOROUS FILM AND METHOD FOR PRODUCING THE SAME

This application is a U.S. National Stage of PCT/JP2009/063636 filed Jul. 31, 2009.

TECHNICAL FIELD

The present invention relates to a microporous film, a method for producing the same, and a battery separator.

BACKGROUND ART

Microporous films, particularly polyolefin microporous films are used for microfiltration membranes, battery separators, capacitor separators, materials for fuel cells, and the like, and particularly are suitably used as lithium ion battery separators. In recent years, while lithium ion batteries have been used in application to small-sized electronic apparatuses such as cellphones and laptop personal computers, application of the lithium ion batteries to hybrid electric vehicles and the like has also been attempted.

Here, higher output characteristics to extract more energy in a short time are demanded of the lithium ion battery for hybrid electric vehicles. Moreover, securing of higher safety is demanded because the lithium ion battery for hybrid electric vehicles is generally large-sized, and needs a higher energy capacity. The safety described here is safety such that a battery short accompanied by melting of a resin used for a separator particularly in a high temperature state produced during using the battery is prevented. Here, a temperature when a short occurs within the battery may be referred to as a film rupture temperature of the separator, and a higher film rupture temperature is a measure to realize improvement in safety of the battery.

For the purpose of providing a microporous film that serves as a separator and can be ready for such circumstances, for example, Patent Literature 1 has disclosed a composite microporous film (battery separator) having a laminated layer structure in which a polypropylene microporous film is laminated on a conventional polyethylene microporous film. Moreover, Patent Literature 2 has disclosed a technique to coat a synthetic resin microporous film made of polyethylene with a specific resin porous powder polymer.

CITATION LIST

Patent Literature

Patent Literature 1: Japanese Patent Laid-Open No. 05-251069
Patent Literature 2: Japanese Patent Laid-Open No. 03-291848

SUMMARY OF INVENTION

Technical Problems

Here, polypropylene is used for the composite microporous film of Patent Literature 1 in order to make a short temperature higher. Namely, the separator needs to maintain a film form also in the high temperature condition to keep insulation between electrodes. However, a polypropylene resin used as a heat-resistant layer has a low film rupture temperature, and has insufficient heat resistance under severe conditions in a cell oven test performed in recent years or the like (there is room for further improvement from the viewpoint of the film rupture temperature).

The microporous film of Patent Literature 2 has improved stability at a high temperature. On the other hand, the film rupture temperature thereof is low, and heat resistance is also insufficient under severe conditions in the above-mentioned cell oven test or the like.

The present invention has been made in consideration of the above-mentioned circumstances. An object of the present invention is to provide a microporous film having a high film rupture temperature and a good balance among permeability, puncture strength, electric resistance of the film, and a thermal shrinkage rate.

Solution to Problem

As a result of repeated extensive examination in order to solve the above-mentioned problems, the present inventors found out that a microporous film which is made of a thermoplastic resin composition comprising (a) 100 parts by mass of a polypropylene resin and (b) 5 to 90 parts by mass of a polyphenylene ether resin, and which has a sea island structure comprising a sea portion comprising the polypropylene resin as a principal component and an island portion comprising the polyphenylene ether resin as a principal component and having pores formed at an interface between the sea portion and the island portion and within the sea portion has a high film rupture temperature; and in the case where the microporous film is used as a battery separator, the microporous film has a good balance among permeability, puncture strength, electric resistance of the film, and a thermal shrinkage rate. Thus, the present inventors have completed the present invention.

Namely, the present invention is as follows.

[1] A microporous film which is made of a thermoplastic resin composition comprising (a) 100 parts by mass of a polypropylene resin and (b) 5 to 90 parts by mass of a polyphenylene ether resin, and which has a sea island structure comprising a sea portion comprising the polypropylene resin as a principal component and an island portion comprising the polyphenylene ether resin as a principal component, wherein pores are formed at an interface between the sea portion and the island portion and within the sea portion.

[2] The microporous film according to [1] above, wherein the thermoplastic resin composition further comprises (c) a compatibilizing agent.

[3] The microporous film according to [1] or [2] above, wherein a particle size of the island portion is 0.01 to 10 μm.

[4] The microporous film according to any of [1] to [3] above, wherein a mean porosity size as measured with a mercury porosimeter is 0.01 to 0.50 μm.

[5] The microporous film according to any of [1] to [4] above, wherein the thermoplastic resin composition further comprises (d) 0.01 to 0.50 parts by mass of inorganic particulates.

[6] A battery separator comprising a microporous film according to any of [1] to [5] above.

[7] A method for producing a microporous film, comprising the steps of (A) to (D) below:

(A) a step of taking off a thermoplastic resin composition in a molten state at a draw ratio of 10 to 300 to obtain a film, the thermoplastic resin composition comprising (a) 100 parts by mass of a polypropylene resin and (b) 5 to 90 parts by mass of a polyphenylene ether resin;

(B) a step of heat-treating the film obtained at the step (A) at a temperature of not less than 100° C. and not more than 160° C.;

(C) a cold stretching step of stretching the film obtained at the step (B) at a temperature of not less than −20° C. and less than 100° C.; and (D) a hot stretching step of stretching the film obtained at the step (C) at a temperature of not less than 100° C. and less than 170° C.

[8] The method for producing a microporous film according to [7] above, further comprising: (E) a thermal relaxation step of thermally relaxing the film obtained at the step (D) at a temperature of not less than 100° C. and less than 170° C.

[9] The method for producing a microporous film according to [7] or [8] above, wherein a strain rate during stretching at the step (D) is 0.10 to 1.00/sec.

[10] The method for producing a microporous film according to any of [7] to [9], wherein at the step (D), the film obtained at the step (C) is stretched at not less than two stage different temperatures.

[11] The method for producing a microporous film according to [10] above, wherein the not less than two different temperatures comprise a temperature of an initial stage of stretching at the step (D) and a temperature of a final stage of stretching at the step (D) higher than the temperature of the initial stage, and the temperature is raised stepwise or gradually from the temperature of the initial stage to the temperature of the final stage.

[12] The method for producing a microporous film according to any of [7] to [11], wherein a stretch temperature at the step (D) is lower than a heat treatment temperature at the step (B).

[13] The method for producing a microporous film according to any of [8] to [12], wherein thermal relaxation at the step (E) is performed at the final stage temperature at the step (D).

Advantageous Effects of Invention

According to the present invention, a microporous film having a high film rupture temperature and a good balance among permeability, puncture strength, electric resistance of the film, and a thermal shrinkage rate can be obtained.

DESCRIPTION OF EMBODIMENTS

Figure 1:
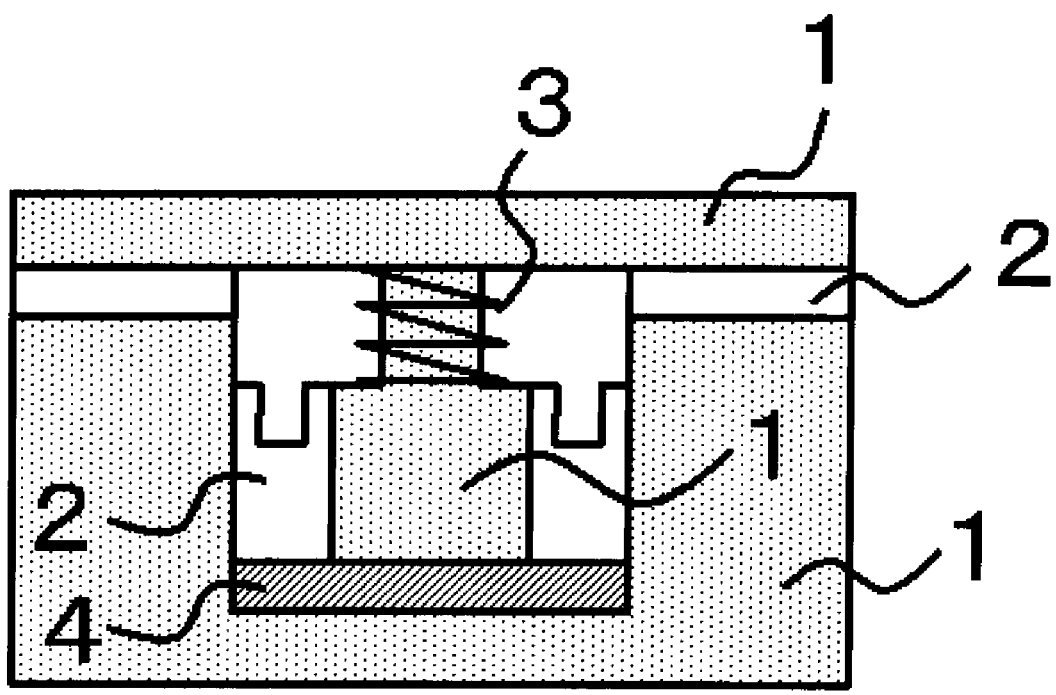
FIG. 1 is a schematic view of a cell for measuring electric resistance of a film.

Hereinafter, the best mode for carrying out the present invention (hereinafter, abbreviated to "the present embodiment") will be described in detail. Here, the present invention is not limited to the following embodiment, and can be practiced within the gist thereof by making various changes and modifications.

A microporous film according to the present embodiment is a microporous film which is made of a thermoplastic resin composition comprising (a) 100 parts by mass of a polypropylene resin and (b) 5 to 90 parts by mass of a polyphenylene ether resin, and which has a sea island structure comprising a sea portion comprising the polypropylene resin as a principal component and an island portion comprising the polyphenylene ether resin as a principal component, wherein pores are formed at an interface between the sea portion and the island portion and within the sea portion.

[Thermoplastic Resin Composition]
[Polypropylene Resin]

Examples of the (a) polypropylene resin (hereinafter, abbreviated to "PP" in some cases) in the present embodiment include homopolymers, random copolymers, and block copolymers. The homopolymers thereof are preferable from the viewpoint of physical properties and application of the microporous film obtained.

In addition, a polymerization catalyst used to obtain the polypropylene resin is not particularly limited, either. Examples thereof include Ziegler-Natta catalysts and metallocene catalysts. Stereoregularity of the polypropylene resin is not particularly limited, either, and isotactic or syndiotactic polypropylene resins are used.

The polypropylene resins are used alone, or two or more thereof are mixed and used. The polypropylene resin may have any crystallinity and any melting point, and may be a polypropylene resin obtained by blending two polypropylene resins having different properties at an arbitrary blending ratio according to physical properties and application of the microporous film to be obtained.

The polypropylene resin used in the present embodiment can usually be selected from the polypropylene resins whose melt flow rate (MFR) (measured at 230° C. and load of 2.16 kg according to ASTM D1238. The same shall apply hereinafter) is preferably from 0.1 to 100 g/10 minutes, and more preferably from 0.1 to 80 g/10 minutes. The MFR of the polypropylene resin is preferably within the above-mentioned range from a viewpoint of good dispersibility of the polyphenylene ether resin and from a viewpoint of moldability such that the film hardly breaks when the polypropylene resin is processed into a microporous film.

Other than the above-mentioned polypropylene resins, the polypropylene resin in the present embodiment may be known modified polypropylene resins described in Japanese Patent Laid-Open No. 44-15422, Japanese Patent Laid-Open No. 52-30545, Japanese Patent Laid-Open No. 06-313078, and Japanese Patent Laid-Open No. 2006-83294. The polypropylene resin in the present embodiment may be a mixture of the above-mentioned polypropylene resin and the modified polypropylene resin in an arbitrary proportion.

[Polyphenylene Ether Resin]

Examples of the (b) polyphenylene ether resin (hereinafter, abbreviated to "PPE" in some cases) in the present embodiment include those having a repeating unit represented by the following general formula (1):

[Formula 1]

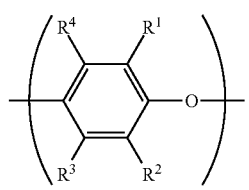

(1)

Here, in the formula (1), $R^1$, $R^2$, $R^3$, and $R^4$ each independently designate a group selected from the group consisting of a hydrogen atom, halogen atoms, lower alkyl groups having 1 to 7 carbon atoms, a phenyl group, haloalkyl groups, aminoalkyl groups, hydrocarbon oxy groups, and halohydrocarbon oxy groups in which a halogen atom and an oxygen atom are separated by at least two carbon atoms.

For example, specific examples of PPE include poly(2,6-dimethyl-1,4-phenyleneether), poly(2-methyl-6-ethyl-1,4-phenyleneether), poly(2-methyl-6-phenyl-1,4-phenyleneether), and poly(2,6-dichloro-1,4-phenyleneether). Examples of PPE also include polyphenylene ether copolymers such as copolymers of 2,6-dimethylphenol and other phenols (for example, 2,3,6-trimethylphenol and 2-methyl-6-butylphenol). Of these, in particular, poly(2,6-dimethyl-1,4-phenyleneether) and a copolymer of 2,6-dimethylphenol and 2,3,6-trimethylphenol are preferable, and poly(2,6-dimethyl-1,4-phenyleneether) is more preferable.

A production method of PPE is not particularly limited, and known production methods can be used.

As the PPE in the present embodiment, known modified PPE can also be used, which is obtained by reacting the above-mentioned PPE with a styrene monomer and/or $\alpha,\beta$-unsaturated carboxylic acid or a derivative thereof (for example, an ester compound, an acid-anhydride compound) at a temperature of 80 to 350° C. in a molten state, in a solution state, or a slurry state in the presence or absence of a radical generator. The PPE in the present embodiment may also be a mixture of the above-mentioned PPE and the modified PPE in an arbitrary proportion. The reduced viscosity of the PPE is preferably 0.15 to 2.5, and more preferably 0.30 to 2.00.

The thermoplastic resin composition in the present embodiment comprises (b) 5 to 90 parts by mass of the polyphenylene ether resin based on (a) 100 parts by mass of the polypropylene resin, and comprises preferably 10 to 80 parts by mass of the polyphenylene ether resin, and more preferably 20 to 65 parts by mass thereof. The proportion of the PPE to be comprised set in the above-mentioned range is suitable from the viewpoint of stretchability of the microporous film obtained.

As the PPE in the present embodiment, other than the above-mentioned PPE, polystyrene in which high impact polystyrene, syndiotactic polystyrene, and/or rubber-reinforced syndiotactic polystyrene are added is suitably used.

[Compatibilizing Agent]

The microporous film in the present embodiment is a microporous film having a sea island structure comprising a sea portion comprising (a) the polypropylene resin as a principal component and an island portion comprising (b) the polyphenylene ether resin as a principal component as morphology, and preferably having a particle size of the island portion in the range of 0.01 µm to 10 µm. When a microporous film has the above-mentioned sea island structure, the microporous film according to the present embodiment maintains a high film rupture temperature while having better permeability.

In order to satisfy these conditions, preferably, the thermoplastic resin composition according to the present embodiment further comprises (c) a compatibilizing agent in addition to the polypropylene resin and the polyphenylene ether resin. Here, "comprising as a principal component" means that a proportion of a specific component in the matrix component comprising the specific component is preferably not less than 50% by mass and more preferably not less than 80% by mass, and may be 100% by mass.

The compatibilizing agent in the present embodiment acts as a dispersing agent for dispersing the polyphenylene ether resin into particles in the matrix of the above-mentioned polypropylene resin. Further, the compatibilizing agent provides an effect of giving good porosity and good air permeability to the microporous film according to the present embodiment.

As the compatibilizing agent in the present embodiment, hydrogenated block copolymers are preferable from the viewpoint of dispersibility of the polyphenylene ether resin. The hydrogenated block copolymer is a block copolymer obtained by performing a hydrogenation reaction of a block copolymer consisting of at least one polymer block A mainly composed of a structural unit of a vinyl aromatic compound and at least one polymer block B mainly composed of a structural unit of a conjugated diene compound.

Examples of the vinyl aromatic compound that forms the structural unit of polymer block A include one or more selected from the group consisting of styrene, $\alpha$-methylstyrene, vinyltoluene, p-tert-butylstyrene, and diphenylethylene, for example. Of these, styrene is preferable.

Polymer block A mainly composed of the structural unit of the vinyl aromatic compound means a homopolymer block of the vinyl aromatic compound, or a copolymer block of the vinyl aromatic compound and a monomer copolymerizable with the vinyl aromatic compound, and is preferably a polymer block comprising not less than 70% by mass of the structural unit of the vinyl aromatic compound.

Examples of the conjugated diene compound that forms the structural unit of polymer block B include one or more selected from the group consisting of butadiene, isoprene, 1,3-pentadiene, and 2,3-dimethyl-1,3-butadiene. Of these, butadiene, isoprene, and a combination thereof are preferable. Polymer block B mainly composed of the structural unit of the conjugated diene compound means a homopolymer block of the conjugated diene compound, or a copolymer block of the conjugated diene compound and a monomer copolymerizable with the conjugated diene compound, and is preferably a polymer block comprising not less than 70% by mass of the structural unit of the conjugated diene compound.

With respect to a microstructure (bonding form of the conjugated diene compound) in polymer block B, the total of the amount of 1,2-vinyl bonds and the amount of 3,4-vinyl bonds (hereinafter, abbreviated to an "amount of vinyl bonds") is preferably 40 to 90%, and more preferably 45 to 85%. Here, the "amount of vinyl bonds" means the proportion of the number of vinyl bonds that remain in polymer block B after polymerization to the number of vinyl bonds that the conjugated diene compound has before polymerization. The connection form and the "vinyl bond amount" of these conjugated diene compounds are derived from an infrared spectroscopy spectrum. However, a value of the "amount of vinyl bonds" derived using an NMR spectrum may be converted into a value derived from an infrared spectroscopy spectrum. The conversion can be performed as follows: about polymers having the same amount of vinyl bonds, the "amounts of vinyl bonds" of the polymers are derived from an infrared spectroscopy spectrum and from an NMR spectrum, respectively, and a calibration curve between those measuring methods is created. At an amount of vinyl bonds of not less than 40%, the microporous film according to the present embodiment tends to have a better balance between porosity and permeability.

The number average molecular weight of the block copolymer having the above-mentioned structure is preferably from 5,000 to 1,000,000 as a value measured with gel permeation chromatography using polystyrene as a reference material. Molecular weight distribution, i.e., a ratio of a weight average molecular weight (Mw) and the number average molecular weight (Mn), which is measured with gel permeation chromatography using polystyrene as a reference material, is preferably not more than 10. The molecular structure of this block copolymer may be linear, branched, radial or an arbitrary combination of these.

The block copolymer having such a structure is turned into a hydrogenated block copolymer, i.e., a hydrogenated product of a vinyl aromatic compound-conjugated diene compound block copolymer by adding hydrogen to aliphatic double bonds (vinyl bonds) of polymer block B comprised in the block copolymer, and is used as the compatibilizing agent. The hydrogenation proportion of the aliphatic double bonds is preferably not less than 80% based on the whole amount of the aliphatic double bonds that the block copolymer before hydrogenation has. The hydrogenation proportion is derived with an infrared spectroscopy spectrum in the same manner as in the case of the above-mentioned amount of vinyl bonds. Alternatively, the hydrogenation proportion may be a value obtained by converting the hydrogenation proportion derived with an NMR spectrum into a value derived from an infrared spectroscopy spectrum.

The proportion of the compatibilizing agent in the above-mentioned thermoplastic resin composition is preferably 1 to 20% by mass based on the whole amount of the composition, and more preferably 1 to 15% by mass. At a proportion of the compatibilizing agent in the above-mentioned range, dispersibility of the polyphenylene ether resin and porosity and air permeability of the microporous film attributed to the dispersibility tend to be better.

[Inorganic Particulates]

The microporous film according to the present embodiment may further comprise (d) inorganic particulates. As (d) the inorganic particulates comprised in the microporous film, metal oxides such as titanium oxide, silicon oxide, and aluminum oxide are preferable from the viewpoint of good appearance of the microporous film. Titanium oxide is more preferable. Here, it is presumed that use of titanium oxide as the inorganic particulates accelerates crystallization of (a) the polypropylene resin to increase a degree of crystallinity, and accelerates opening in stretch opening of the resin composition. As a result, in the microporous film obtained, improvement in puncture strength and reduction in air permeability can be compatible.

The amount of the inorganic particulates to be added is 0.01 to 0.50 parts by mass based on (a) 100 parts by mass of the polypropylene resin, and more preferably 0.05 to 0.10 parts by mass. An amount of the inorganic particulates to be added of not less than 0.01 parts by mass is preferable from the viewpoint of improving permeability of the microporous film obtained. On the other hand, an amount the inorganic particulates to be added of not more than 0.50 parts by mass is preferable from the viewpoint of reduction in aggregated inorganic particulates in the thermoplastic resin composition and suppression of poor dispersion.

Surprisingly, it is found out that permeability of the microporous film in the present embodiment is significantly improved only by adding a slight amount of 0.01 to 0.50 parts by mass of the inorganic particulates to the above-mentioned thermoplastic resin composition. As shown in Japanese Patent Laid-Open No. 2001-135295, presence of such inorganic particulates in the microporous film can improve mechanical strength of the microporous film, but cannot improve permeability. Although details are not fully clear, it is clear that in the production process of the microporous film obtained in the present embodiment, an effect of making stretch opening easier and improving permeability is given to the thermoplastic resin composition including polypropylene and polyphenylene ether by the inorganic particulates uniformly dispersed in the resin composition. However, the reason is not limited to this.

The average particle size of the inorganic particulates is not particularly limited. Preferably, the average particle size of the inorganic particulates is in the range of 0.1 to 10 μm because the film thickness of the microporous film obtained in the present embodiment is approximately 20 μm, and because the inorganic particulates in the thermoplastic resin composition tend to have better dispersibility. At an average particle size of the inorganic particulates in the range of 0.1 to 10 μm, dispersibility in thermoplastic resin plastic products tends to be better, and occurrence of foreign substances and pinholes caused by aggregation of the inorganic particulates tends to be suppressed in the microporous film obtained. Here, an average particle size of the inorganic particulates means an average value when the inorganic particulates are observed with a scanning electron microscope (HITACHI S-4700), an average value of a longer diameter and a shorter diameter of a particulate is defined as a particle size, and the number of sampled inorganic particulates is 100.

Other than the respective components mentioned above, additional components may be added to the thermoplastic resin composition in the present embodiment when necessary in the range not to impair the effect obtained by the present invention, for example, olefin elastomers, an antioxidant, a metal deactivator, a thermal stabilizer, a flame retardant (organophosphate ester compounds, ammonium polyphosphate compounds, an aromatic halogen flame retardant, silicone flame retardant, and the like), fluorine polymers, plasticizers (low molecular weight polyethylenes, epoxidized soybean oil, polyethylene glycol, fatty acid esters, and the like), flame retardant synergists such as antimony trioxide, weatherability (light resistant) improving agents, a slipping agent, inorganic or organic fillers and reinforcing agents (polyacrylonitrile fibers, carbon black, calcium carbonate, conductive metal fibers, conductive carbon black, and the like), various coloring agents, and a release agent.

The microporous film in the present embodiment is a microporous film having pores formed at an interface between the sea portion and the island portion and within the sea portion. Here, the sea portion may comprise the above-mentioned compatibilizing agent, inorganic particulates, and additional components other than the polypropylene resin. The island portion may also comprise the above-mentioned compatibilizing agent and additional components other than the polyphenylene ether resin. Namely, the interface between the sea portion and the island portion includes an interface between the polypropylene resin and the polyphenylene ether resin, and an interface among the polypropylene resin, the compatibilizing agent, the inorganic particulates, and the additional component, and the like in the case where the compatibilizing agent, the inorganic particulates, and the additional components are comprised. The pores formed at the interface between the sea portion and the island portion can be formed by applying a method for producing a microporous film described later, for example. By the method, the interface between the sea portion and the island portion peels off to form continuous pores in a film thickness direction.

The pores formed within the sea portion mean micropores formed by occurrence and growth of crazes between lamella crystals of the sea portion comprising the polypropylene resin as a principal component. The pores formed within the sea portion can be formed by applying the method for producing a microporous film described later, for example. By the method, in addition to micropores caused by peeling off of the interface between the sea portion and the island portion mentioned above, micropores are formed also within the sea portion, which is a matrix region, to form continuous pores in a film thickness direction.

Although the details about a mechanism to form two different kinds of micropores are not clear as mentioned above, a microporous film having the micropores formed also within the sea portion in addition to the micropores caused by peeling off of the interface between the sea portion and the island portion is more suitable as a battery separator than a microporous film in which only micropores caused by peeling off of the interface between the sea portion and the island portion exist because a balance among puncture strength, electric resistance of the film, and the thermal shrinkage rate is drastically improved.

The two kinds of micropores mentioned above can be measured and observed easily using a transmission electron microscope (SEM) or the like. Giving an example of observation by an electron microscope, a microporous film to be measured is placed onto a sample stand, and approximately 3-nm coating of osmium is performed on the microporous film. Then, using a scanning electron microscope (HITACHI S-4700), the microporous film can be observed as an SEM image of a film cross section (direction parallel to MD) at an accelerating voltage of 1 kV.

Figure 3:
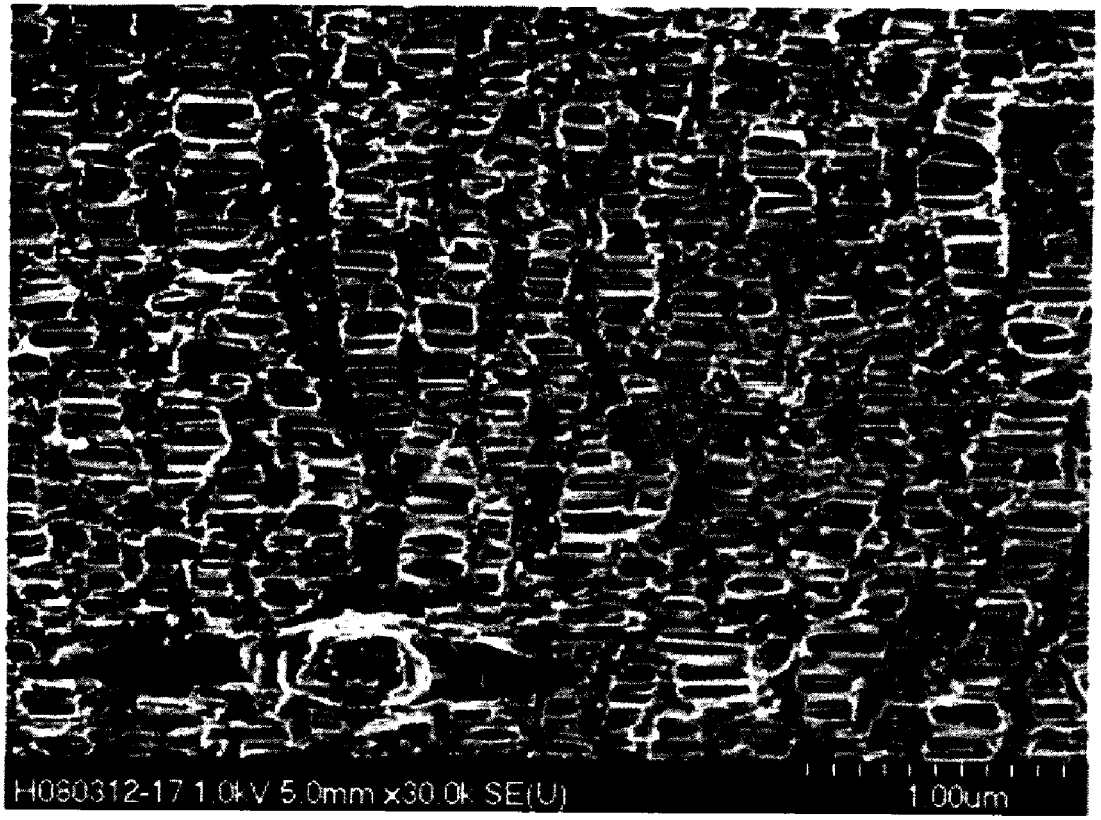
FIG. 3 is an SEM image of a microporous film according to Example 4.

FIG. 3 shows an SEM image of the microporous film according to the present embodiment (at a magnification of 30,000). FIG. 3 shows that two kinds of pores, i.e., pores formed at the interface between the sea portion and the island portion and pores formed within the sea portion exist in the microporous film according to the present embodiment.

The mean porosity size of the microporous film according to the present embodiment is 0.01 to 0.50 μm, and preferably 0.05 to 0.50 μm. Here, a mode diameter as measured with the mercury porosimeter is used as the mean porosity size of the microporous film. At a mean porosity size in the above-mentioned range, a microporous film having a good balance between an electric resistance value as a battery separator and film strength is likely to be obtained. The microporous film according to the present embodiment has the two different kinds of micropores as mentioned above, and the mean porosity size here means an average value with respect to the two kinds of micropores.

[Physical Properties of Microporous Film]

The microporous film in the present embodiment shows physical properties below, and has a good balance among permeability, puncture strength, electric resistance of the film, and a thermal shrinkage rate.

The porosity of the microporous film in the present embodiment is preferably 20% to 70%, more preferably 35% to 65%, and still more preferably 45% to 60%. At a porosity of not less than 20%, sufficient ionic permeability can be ensured in the case where the microporous film is used for application to the battery. On the other hand, sufficient mechanical strength of the microporous film can be ensured at a porosity of not more than 70%. The film thickness of the microporous film in the present embodiment is preferably 5 to 40 μm, and more preferably 10 to 30 μm.

Here, the porosity of the microporous film in the present embodiment is calculated according to a method described in Examples described below. The porosity of the microporous film can be adjusted within the above-mentioned range by properly setting the composition of the thermoplastic resin composition, the stretch temperature, the stretch ratio, and the like.

The air permeability of the microporous film in the present embodiment is preferably 10 sec/100 cc to 5000 sec/100 cc, more preferably 50 sec/100 cc to 1000 sec/100 cc, and still more preferably 100 sec/100 cc to 500 sec/100 cc. An air permeability of not more than 5000 sec/100 cc can contribute to ensuring sufficient ionic permeability of the microporous film. On the other hand, an air permeability of not less than 10 sec/100 cc is suitable from the viewpoint of obtaining a uniform microporous film without defects.

Here, the air permeability of the microporous film in the present embodiment is calculated according to a method in Examples described below. The air permeability of the microporous film can be adjusted within the above-mentioned range by properly setting the composition of the thermoplastic resin composition, the stretch temperature, the stretch ratio, and the like.

[Method for Producing Microporous Film]

A method for producing a microporous film according to the present embodiment comprises each step of (A) to (D) below.

(A) a step of taking off a thermoplastic resin composition at a draw ratio of 10 to 300 to obtain a film, the thermoplastic resin composition comprising (a) 100 parts by mass of a polypropylene resin and (b) 5 to 90 parts by mass of a polyphenylene ether resin in a molten state;

(B) a step of heat-treating the film obtained at the step (A) at a temperature of not less than 100° C. and not more than 160° C.;

(C) a cold stretching step of stretching the film obtained at the step (B) at a temperature of not less than −20° C. and less than 100° C.; and (D) a hot stretching step of stretching the film obtained at the step (C) at a temperature of not less than 100° C. and less than 170° C.

Hereinafter, the respective steps are referred to as a film forming step (A), a heat treatment step (B), a cold stretching step (C), and a hot stretching step (D).

As a method of forming a thermoplastic resin composition into a film form at the film forming step (A), film forming methods such as T die extrusion, blown film extrusion, calendering, and a skeif method can be used. Of these, T die extrusion is preferable from the viewpoint of physical properties and application demanded of the microporous film obtained in the present embodiment. Moreover, at the film forming step, the thermoplastic resin composition may be filtered using a filter or the like installed in an extruder, and subsequently may be subjected to film forming.

On the other hand, at the cold stretching step (C) and the hot stretching step (D), a method for stretching in a uniaxial direction and/or in a biaxial direction at one stage or not less than two stages by a roll, a tenter, an autograph, or the like can be used. Of these, uniaxial stretching at not less than two stages by a roll is preferable from the viewpoint of physical properties and application demanded of the microporous film obtained in the present embodiment.

Hereinafter, an example is given to describe a method for producing a microporous film according to the present embodiment, but the present embodiment will not be limited to this example.

[(A) Film Forming Step]

At the film forming step, the thermoplastic resin composition comprising (a) the polypropylene resin, (b) the polyphenylene ether resin, and (c) the compatibilizing agent and (d) the inorganic particulates when necessary is supplied to an extruder, and molten kneaded preferably at a temperature of 200° C. to 350° C. and more preferably at a temperature of 260° C. to 320° C. By pelletizing the kneaded product thus obtained, pellets of the thermoplastic resin composition in which the polyphenylene ether resin is dispersed in the polypropylene resin is obtained. Next, the obtained pellets are supplied to the extruder, and extruded from a T-shaped die into a film form preferably at a temperature of 200° C. to 350° C. and more preferably at a temperature of 260° C. to 320° C. The obtained film is casted onto a roll preferably at 20 to 150° C. and more preferably at 50° C. to 120° C., and cooled and solidified.

Alternatively, the resin composition comprising (a) the polypropylene resin, (b) the polyphenylene ether resin, and (c) the compatibilizing agent and (d) the inorganic particulates when necessary is supplied to an extruder, and molten kneaded preferably at a temperature of 200° C. to 350° C. and more preferably at a temperature of 260° C. to 320° C. Thereby, a kneaded product in which the polyphenylene ether resin is dispersed in the polypropylene resin is obtained. Without once forming this kneaded product into a pellet form, the kneaded product is directly extruded from a T-shaped die into a film form. The obtained film is casted onto a roll preferably at 20 to 150° C. and more preferably at 50° C. to 120° C., and cooled and solidified.

In the film forming step, the molten thermoplastic resin composition is discharged from the T-shaped die into a film-like melt, and the film-like melt is taken off at a draw ratio of 10 to 300, preferably 50 to 250, and more preferably 130 to 200, and formed into a film-like formed body. A draw ratio in the above-mentioned range is preferable from the viewpoint of forming two different kinds of micropores, i.e., the micropores caused by peeling off of the interface between the sea portion and the island portion and the micropores formed in the sea portion as a matrix region at the stretching step described later. At a draw ratio of not less than 10, the micropores are easily formed in the sea portion. On the other hand, at a draw ratio of not more than 300, it is likely that the film-like formed body can be stably formed.

[(B) Heat Treatment Step]

At the heat treatment step (B), the film-like formed body obtained at the step (A) is kept at a temperature of not less than 100° C. and not more than 160° C. for a certain period of time. Examples of the method for heat treating a film-like formed body are not particularly limited, and include a method for placing a film-like formed body at rest within a temperature-controlled oven set at the above-mentioned temperature. A heat treatment temperature in the above-mentioned range is preferable because the micropores are easily formed in the sea portion as the matrix region at the stretching step described later. At a heat treatment temperature of not less than 100° C., lamella crystals of the polypropylene resin easily grow. On the other hand, at a heat treatment temperature of not more than 160° C., lamella crystals of the polypropylene resin can stably exist without being molten.

[(C) Cold Stretching Step]

At the cold stretching step (C), the film obtained at the above-mentioned heat treatment step (B) undergoes a first stretch at a temperature of not less than −20° C. and less than 100° C., and preferably at a temperature of not less than 0° C. and less than 50° C. preferably not less than 1.1 times and less than 2.0 times in an extrusion direction (hereinafter, written as "MD direction"), and preferably 1.0 time to 2.0 times in a width direction (hereinafter, written as "TD direction"), respectively. Thereby, a first stretched film is obtained. More preferably, the temperature and the stretch ratio in the first stretch are 1.1 times to 2.0 times in the MD direction at a temperature of not less than 0° C. and less than 50° C. Uniaxial stretching is preferable. At a temperature of not less than −20° C. in the cold stretching step, the film can be stably stretched without breaking. On the other hand, at a temperature of less than 100° C., the microporous film having high porosity and low air permeability can be obtained.

[(D) Hot Stretching Step]

At the hot stretching step (D), the first stretched film obtained at the above-mentioned cold stretching step (C) undergoes second stretch at a temperature of not less than 100° C. and less than 170° C., and preferably at a temperature of not less than 110° C. and less than 160° C. preferably not less than 1.1 times and less than 5.0 times in the MD direction, and preferably 1.0 time to 5.0 times in the TD direction, respectively. Thereby, the microporous film according to the present embodiment is obtained. At a temperature of not less than 100° C. at the hot stretching step, the film can be stably stretched without breaking. On the other hand, at a temperature of less than 170° C., the microporous film having high porosity and low air permeability can be obtained.

From the viewpoint of physical properties and application demanded of the microporous film according to the present embodiment, stretch is preferably performed on the conditions mentioned above at not less than two stages (the step (C) and the step (D)).

To be surprised, it is found out that by stretching on the conditions mentioned above at not less than two stages, good permeability can be given to the microporous film according to the present embodiment. As shown in Japanese Patent Laid-Open No. 08-34872, when a sheet of the thermoplastic resin composition is subjected to hot stretching at one stage, pores are formed in the obtained film while permeability in the thickness direction cannot be obtained. Although the details are not fully clear, it is found out that by stretching on the conditions mentioned above at not less than two stages, the micropores caused by peeling off of the interface between the sea portion and the island portion and the micropores formed in the sea portion are formed into a through hole in the thickness direction so that permeability in the thickness direction manifests itself. However, the reason is not limited to this.

In the method for producing a microporous film according to the present embodiment, a strain rate according to stretch in the above-mentioned hot stretching step (D) is preferably 0.10 to 1.00/sec. Here, the "strain rate" is defined by the following formula.

$$\text{Strain rate}(/\text{sec}) = (V2 - V1)/L$$

wherein $V1$ designates a stretching speed when the second stretch starts (m/sec), $V2$ designates a stretching speed when the second stretch (m/sec) is completed, and $L$ designates a stretch length (m). In the case of a roll type stretching machine, $V1$ and $V2$ are derived from the rotational speed of the roll, and $L$ is equivalent to the distance between rolls.

The strain rate is preferably not less than 0.10/sec and not more than 1.00/sec, more preferably not less than 0.10/sec and not more than 0.80/sec. A strain rate set in the above-mentioned range is suitable from the viewpoint of a balance between air permeability and a thermal shrinkage rate of the microporous film finally obtained.

At the step (D), from the viewpoint of physical properties and application demanded of the microporous film according to the present embodiment, the stretched film obtained at the step (C) is preferably stretched at not less than two stage different temperatures. By stretching at not less than two stage different temperatures, the balance between permeability and thermal shrinkage of the microporous film finally obtained is further improved.

Moreover, from the viewpoint of further improving performance balance between permeability and thermal shrinkage, the not less than two stage different temperatures preferably comprise a temperature of an initial stage of stretching at the step (D) and a temperature of a final stage of stretching at the step (D) higher than the temperature of the initial stage. In short, the temperature of the final stage is preferably higher than the temperature of the initial stage. More preferably, in order to further improve the above-mentioned performance balance, the not less than two stage different temperatures is increased stepwise or gradually from the temperature of the initial stage to the temperature of the final stage.

To set the stretch temperature at the not less than two stage different temperatures in the hot stretching step (D), using a roll type multi-stage stretching apparatus, the temperatures in the stretch region at the respective stages in the apparatus may be adjusted at different temperatures, for example.

To be surprised, it is found out that by performing stretching at the step (D) at a temperature lower than the heat treatment temperature at the step (B), the permeability of the microporous film obtained is improved more than expected. Although the details are not fully clear, it is presumed that stretching on the above-mentioned conditions allows stretch while lamella crystals of the polypropylene resin, which are one of the factors that manifest permeability, exist stably in a specific resin composition used in the present embodiment. However, the reason is not limited to this.

[(E) Thermal Relaxation Step]

The method for producing a microporous film according to the present embodiment further comprises a thermal relaxation step of thermally relaxing the film obtained at the above-mentioned step (D) at a temperature of not less than 100° C. and less than 170° C. Thermal relaxation is a method for thermally shrinking the length of the stretched film at the step (D) so that the length thereof may be shortened by approximately 5 to 50% in advance in order to prevent shrinkage in the stretch direction of the microporous film due to residual stress. The microporous film having a good thermal shrinkage rate tends to be obtained by this thermal relaxation. The proportion to shorten the length (5 to 50%) is referred to as a relaxation rate. In the case where a roll-type stretching apparatus is used, the relaxation rate can be calculated from a difference of the rotational speed between rolls in which thermal relaxation is performed.

The temperature of thermal relaxation is a temperature of not less than 100° C. and less than 170° C., and preferably 120 to 160° C. The temperature of not less than 100° C. controls the thermal shrinkage rate. On the other hand, the temperature of less than 170° C. can reduce air permeability. From the viewpoint of further improving the balance between permeability and thermal shrinkage of the microporous film, at the thermal relaxation step, thermal relaxation is preferably performed at the final stage temperature at the above-mentioned hot stretching step (D).

In the thermal relaxation step (E), a method for relieving the film by a roll, a tenter, an autograph, or the like at one stage or at not less than two stages in a uniaxial direction and/or a biaxial direction can be used.

To be surprised, in the case where the method for producing microporous film according to the present embodiment uses the above-mentioned thermoplastic resin composition, it is recognized that the balance between the air permeability and the thermal shrinkage rate is improved more than expected. Although the reason is not certain, it is considered that the PPE resin having high heat resistance that is dispersed and exists in the PP matrix makes a contraction stress relaxation behavior at the time of thermal relaxation more efficient. However, the reason is not limited to this.

The microporous film in the present embodiment may form a laminated film by laminating other resin film thereon. Examples of such other resin films include microporous films made of polyolefin resins such as polyethylene resin and polypropylene resin, and microporous films made of saturated polyester resins such as polyethylene terephthalate resins and polybutyrene terephthalate resins. Preferably, from the viewpoint of physical properties and application demanded of the laminated film obtained, the laminated film is a microporous laminated film in which a microporous film comprising a resin having a melting point of 110° C. to 150° C. measured by a method according to JIS K-7121 and the microporous film in the present embodiment are laminated. Safety of the battery is drastically improved in the case where the microporous laminated film in which a microporous film comprising a resin having a melting point of 110° C. to 150° C. and the microporous film in the present embodiment are laminated is used for a battery separator. Examples of the resin having a melting point of 110° C. to 150° C. include polyethylene resins. More specifically, examples thereof include the so-called high density polyethylenes, medium density polyethylenes, and low density polyethylenes.

The other resin film may also comprise a filler such as calcium carbonate, barium sulfate, alumina, and talc, for example. Moreover, the structure of the laminated film may be formed of a film (layer) having not less than two layers. Any of the microporous film in the present embodiment and the other resin film may exist as a surface layer of the laminated film.

Examples of a method for producing a laminated film include a co-extruding method using a T die or a circular die, a laminating method for extruding each resin film (layer) separately, and subsequently attaching the resin films to each other, and a laminating method for attaching films porosified separately to each other.

The microporous film according to the present embodiment is a film which is made of the specific thermoplastic resin composition comprising at least (a) the polypropylene resin and (b) the polyphenylene ether resin, as mentioned above. The microporous film according to the present embodiment is suitably produced through a specific production method. The microporous film according to the present embodiment is a microporous film having a good balance among puncture strength, electric resistance of the film, and the thermal shrinkage rate, and having high heat resistance so that the form as a film can be maintained even at a temperature of 200° C. exceeding the melting point of the polypropylene resin while the microporous film is made of the thermoplastic resin having the sea portion comprising the polypropylene resin as a principal component. The microporous film according to the present embodiment can be suitably used for a battery separator, and more specifically used as a separator for lithium ion batteries. In addition, the microporous film according to the present embodiment is used also as various separation films.

EXAMPLES

Next, Examples and Comparative Examples will be given to describe the present embodiment more specifically, but the present embodiment is not limited to the following Examples unless departing from the gist. Used raw materials and various properties are evaluated according to the following methods.

[Raw Material]

(1) Polypropylene Resin for (a) Component

A polypropylene resin having a melt flow rate of 0.4 g/10 min measured by JIS K-7120 (at a temperature of 230° C.) was used.

(2) Polyphenylene Ether Resin for (b) Component

A polyphenylene ether resin obtained by oxidation polymerizing 2,6-xylenol and having a reduced viscosity of 0.54 was used.

(3) Compatibilizing Agent for (c) Component

A hydrogenated product of a styrene-butadiene block copolymer having a structure of polystyrene (i)-polybutadiene polystyrene (ii) hydrogenated was used, wherein the amount of bonded styrene was 43%, the number average molecular weight was 95,000, the total amount of the amount of 1,2-vinyl bonds and that of 3,4-vinyl bonds in polybutadiene before hydrogenation was 80%, the number average molecular weight of polystyrene (i) was 30,000, the number average molecular weight of polystyrene (ii) was 10,000, and the hydrogenation proportion of polybutadiene portions was 99.9%.

(4) Inorganic Particulates for (d) Component

Titanium oxide having a average particle size of 0.40 μm was used.

[Evaluation Method]

(1) Observation of Pore Structure Using SEM

A microporous film to be measured was placed onto a sample stand, and subsequently coated with approximately 3-nm coating of osmium. Using a scanning electron microscope (HITACHI S-4700) at an accelerating voltage of 1 kV, the microporous film was observed from an SEM image of a film cross section (in a direction parallel to the MD). In Table 1, an SEM image in which formation of pores was observed only at an interface between the sea portion and the island portion was designated as (1), and an SEM image in which formation of pores was observed at an interface between the sea portion and the island portion and within the sea portion was designated as (2).

(2) Mean Porosity Size (μm)

The mean porosity size was measured by a mercury porosimeter. Specifically, using a Pore Sizer type 9320 made by Shimadzu Corporation, vacuum degassing was performed for 5 minutes on a sample having a weight of 0.02 mg to 0.04 mg as pretreatment. Then, the sample was measured at an initial pressure of 2.0 psia. From the obtained pore distribution data, the point at which a press volume was largest at not more than 20 μm (mode size) was used as the mean porosity size.

(3) Film Thickness (μm)

The film thickness was measured with a dial gauge (OZAKI MFG Co., Ltd.: "PEACOCK No. 25" (trademark)).

(4) Porosity (%)

A sample of a 10-cm square was taken, and the porosity thereof was calculated based on the volume and mass of the sample using the following formula.

$$\text{Porosity}(\%) = (\text{volume}(cm^3) - \text{mass}(g)/\text{density of polymer composition})/\text{volume}(cm^3) \times 100$$

(5) Air Permeability (sec/100 cc)

The air permeability was measured with a Gurley air permeability tester according to JIS P-8117. A value in terms of the film thickness of 20 μm was shown.

(6) Puncture Strength (N)

A puncture test was carried out using a "handy compression tester, KES-G5 (trade name)," made by Kato Tech Co., Ltd. on conditions that a curvature radius of a needle tip is 0.5 mm and a puncture speed is 2 mm/sec to measure a maximum puncture load (N). A value in terms of the film thickness of 20 μm was shown in the table.

(7) Thermal Shrinkage Rate (%)

A sample of a 12 cm×12 cm square was cut from the film. Two marks were put at an interval of 10 cm on the sample in the MD direction thereof, and two marks were put at an interval of 10 cm on the sample in the TD direction thereof (a total of four marks). In the state where the sample was sandwiched between pieces of paper, the sample was placed at rest for 60 minutes in an oven at 100° C. The sample was extracted from the oven, and cooled. Then, a length (cm) between the marks was measured, and the thermal shrinkage rate was calculated with the following formula.

$$\text{Thermal shrinkage rate}(MD \text{ direction})(\%) = (10 - \text{length in } MD \text{ direction after heating}(cm))/10 \times 100$$

(8) Electric Resistance (Film Resistance) (Ω·cm²)

The microporous film cut into a circular shape was impregnated with an electrolytic solution, and installed in a cell as shown in FIG. 1. First, electric resistance per microporous film (Rs1) was measured. Here, reference numeral 1 in FIG. 1 designates a cell made of SUS, reference numeral 2 designates a Teflon seal, reference numeral 3 designates a spring, and reference numeral 4 designates the microporous film impregnated with the electrolytic solution.

Next, five more microporous films impregnated with the electrolytic solution were added in the cell, and electric resistance per six microporous films in total (Rs6) was measured.

The electric resistance of the microporous film was calculated from Rs1 and Rs6 above with the following formula.

$$\text{Electric resistance}(\Omega \cdot cm^2) = \{[Rs6(\Omega) - Rs1(\Omega)]/5\} \times 2.00(cm^2)$$

Measurement of the electric resistance was performed using LIPASTE-EP2BL/FSI1T (trade name) made by TOMIYAMA PURE CHEMICAL INDUSTRIES, LTD. as the electrolytic solution, and using a HIOKI3532-80 chemical impedance meter made by HIOKI E.E. CORPORATION. A real number portion of impedance at 100 kHz (resistance) was defined as an electric resistance value. An effective area of an electrode shown in FIG. 1 was 2.00 cm².

(9) Film Rupture Temperature

Figure 2:
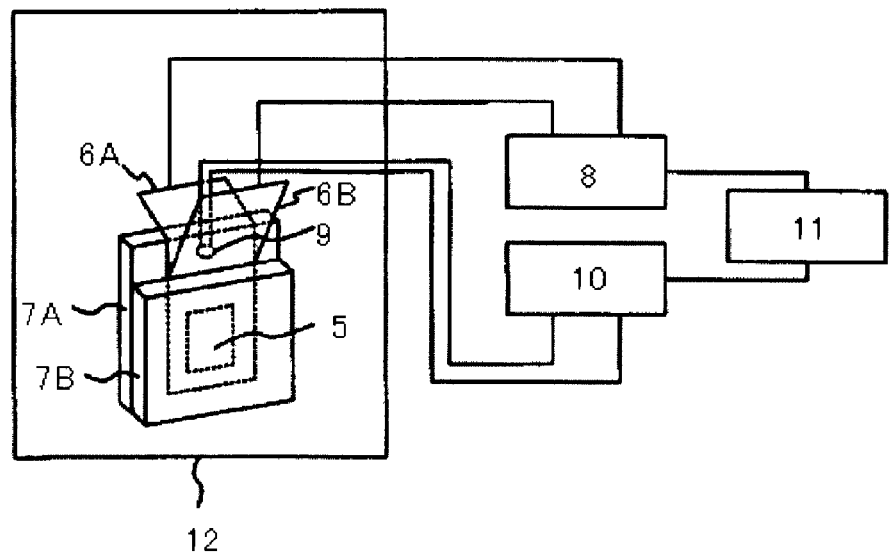
FIG. 2(A) is a schematic view of an apparatus for measuring a film rupture temperature.
FIG. 2(B) is a plan view showing a sample portion of the apparatus for measuring a film rupture temperature.
FIG. 2(C) is a plan view showing a sample portion of the apparatus for measuring a film rupture temperature.
Figure 2:
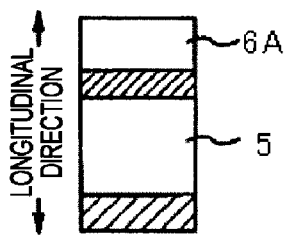
Figure 2:
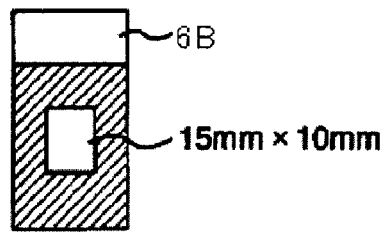

FIG. 2(A) shows a schematic view of an apparatus for measuring a film rupture temperature. Reference numeral 5 is a microporous film, reference numerals 6A and 6B are a nickel foil having a thickness of 10 μm, and reference numerals 7A and 7B are a glass plate. Reference numeral 8 is an electric resistance measuring apparatus (LCR meter "AG-4311" (trademark) made by Ando Electric Co., Ltd.), and is connected with the nickel foils 6A and 6B. Reference numeral 9 is a thermocouple, and is connected with a thermometer 10. Reference numeral 11 is a data collector, and is connected with the electric resistance measuring apparatus 8 and the thermometer 10. Reference numeral 12 is an oven, which heats the microporous film.

Described still in detail, as shown in FIG. 2(B), the microporous film 5 is layered on the nickel foil 6A, and fixed to the nickel foil 6A with a "Teflon (registered trademark)" tape (oblique-lined portion in the figure) in a longitudinal direction. The microporous film 5 is impregnated with a 1 mol/lit. of a lithium-borofluoride solution (solvent: propylene carbonate/ethylene carbonate/γ-butyl lactone=1/1/2) as an electrolytic solution. As shown in FIG. 2(C), a "Teflon (registered trademark)" tape (oblique-lined portion in the figure) is attached to the nickel foil 6B. The nickel foil 6B is masked while a window portion (15 mm×10 mm) is left in a center portion of the foil 6B.

The nickel foil 6A and the nickel foil 6B are layered so as to sandwich the microporous film 5 therebetween. Further, the two nickel foils are sandwiched between the glass plates 7A and 7B from both sides of the nickel foils. At this time, a position is aligned so that the window portion of the foil 6B and the microporous film 5 may face each other.

The two glass plates are fixed by clipping the glass plates with a commercially available double clip. The thermocouple 9 is fixed with a "Teflon (registered trademark)" tape so as to contact both of the glass plates 7A and 7B.

The temperature and the electric resistance were continuously measured with such an apparatus. The temperature was raised from 25° C. to 200° C. at a speed of 2° C./min, and the electric resistance value was measured at an alternating current of 1 kHz. The breaking (short) temperature was defined as a temperature when the electric resistance value of the microporous film once reached $10^3 \Omega$, and subsequently the electric resistance value was reduced lower than $10^3 \Omega$ again. Samples were evaluated as ○ when no short occurs and as x when a short occurs.

Example 1

(a) 100 parts by mass of a polypropylene resin, (b) 67 parts by mass of a polyphenylene ether resin, and (c) 17 parts by mass of a compatibilizing agent were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component and the (c) component were supplied from the second material supply port to the extruder to perform melt kneading. Thus, a thermoplastic resin composition was obtained as pellets.

The pellets of the thermoplastic resin composition obtained as mentioned above was supplied to a single screw extruder set at a screw diameter of 20 mm, L/D=30, and 260° C. through a feeder, and extruded from a T die installed at an end of the extruder and having a lip thickness of 3 mm. Then, the molten resin was immediately exposed to a 25° C. cold air, and taken off at a draw ratio of 150 using a cast roll cooled at 95° C. to form a precursor film.

This precursor film was heat-treated at 130° C. for 3 hours, and uniaxially stretched (in the MD direction, and the same shall apply hereinafter) 1.2 times at a temperature of 25° C. Then, this stretched film was further uniaxially stretched (in the MD direction, and the same shall apply hereinafter) 2.0 times at a temperature of 115° C., and heat set at 145° C. to obtain a microporous film. With respect to the obtained microporous film, SEM observation and measurement of the mean porosity size, the film thickness, porosity, the air permeability, the puncture strength, the film resistance, and the film rupture temperature were carried out, and the results were shown in Table 1.

Example 2

A microporous film was produced by the same method as that in Example 1 except that (a) 100 parts by mass of a polypropylene resin, (b) 43 parts by mass of a polyphenylene ether resin, and (c) 12 parts by mass of a compatibilizing agent were used. Evaluation was made by the same method as that in Example 1. The results were shown in Table 1.

Example 3

A microporous film was produced by the same method as that in Example 1 except that (a) 100 parts by mass of a polypropylene resin, (b) 25 parts by mass of a polyphenylene ether resin, and (c) 7 parts by mass of a compatibilizing agent were used. Evaluation was made by the same method as that in Example 1. The results were shown in Table 1.

Example 4

A microporous film was produced by the same method as that in Example 1 except that (a) 100 parts by mass of a polypropylene resin, (b) 11 parts by mass of a polyphenylene ether resin, and (c) 3 parts by mass of a compatibilizing agent were used. Evaluation was made by the same method as that in Example 1. The results were shown in Table 1.

The SEM image (at a magnification of 30,000) of the obtained microporous film was shown in FIG. 3. FIG. 3 shows that two kinds of pores, i.e., the pores formed at an interface between the sea portion and the island portion and the pores formed within the sea portion exist in the microporous film obtained in Example 2.

Example 5

A microporous film was produced by the same method as that in Example 4 except that the draw ratio was 40 in production of the precursor film. Evaluation was made by the same method as that in Example 1. The results were shown in Table 1. Because pore distribution data was not obtained in measurement of the mean porosity size by the mercury porosimeter, data on the mean porosity size was not described.

Example 6

A microporous film was produced by the same method as that in Example 4 except that the draw ratio was 20 in production of the precursor film. Evaluation was made by the same method as that in Example 1. The results were shown in Table 1.

Example 7

A microporous film was produced by the same method as that in Example 4 except that the heat treatment temperature of the precursor film was 90° C. Evaluation was made by the same method as that in Example 1. The results were shown in Table 1.

Example 8

(a) 100 parts by mass of a polypropylene resin, (b) 11 parts by mass of a polyphenylene ether resin, and (d) 0.07 parts by mass of inorganic particulates were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component and the (d) component were supplied from the second material supply port to the extruder to perform melt kneading. Thus, a thermoplastic resin composition was obtained as pellets.

The pellets of the thermoplastic resin composition obtained as mentioned above was supplied to a single screw extruder set at a screw diameter of 20 mm, L/D=30, and 260° C. through a feeder, and extruded from a T die installed at an end of the extruder and having a lip thickness of 3 mm. Then, the molten resin was immediately exposed to a 25° C. cold air, and taken off at a draw ratio of 150 using a cast roll cooled at 95° C. to form a precursor film.

This precursor film was heat-treated at 130° C. for 3 hours, and uniaxially stretched 1.2 times at a temperature of 25° C. Then, this stretched film was further uniaxially stretched 2.0 times at a temperature of 130° C. to obtain a microporous film. With respect to the obtained microporous film, measurement of the film thickness, the porosity, the air permeability, the puncture strength, and the film rupture temperature were carried out, and the results were shown in Table 1.

Example 9

(a) 100 parts by mass of a polypropylene resin, (b) 11 parts by mass of a polyphenylene ether resin, (c) 3 parts by mass of a compatibilizing agent, and (d) 0.07 parts by mass of inorganic particulates were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component, the (c) component, and the (d) component were supplied from the second material supply port to the extruder to perform melt kneading. Thus, a thermoplastic resin composition was obtained as pellets.

A microporous film was produced by the same method as that in Example 8 using the pellets of the thermoplastic resin composition obtained as mentioned above. With respect to the obtained microporous film, measurement of the film thickness, the porosity, the air permeability, the puncture strength, and the film rupture temperature were carried out, and the results were shown in Table 1.

Example 10

(a) 100 parts by mass of a polypropylene resin and (b) 11 parts by mass of a polyphenylene ether resin were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component were supplied from the second material supply port to the extruder to perform melt kneading. Thus, a thermoplastic resin composition was obtained as pellets.

A microporous film was produced by the same method as that in Example 8 using the pellets of the thermoplastic resin composition obtained as mentioned above. With respect to the obtained microporous film, measurement of the film thickness, the porosity, the air permeability, the puncture strength, and the film rupture temperature were carried out, and the results were shown in Table 1.

Example 11

(a) 100 parts by mass of a polypropylene resin, (b) 11 parts by mass of a polyphenylene ether resin, and (c) 3 parts by mass of a compatibilizing agent were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component and the (c) component were supplied from the second material supply port to the extruder to perform melt kneading. Thus, a thermoplastic resin composition was obtained as pellets.

A microporous film was produced by the same method as that in Example 8 using the pellets of the thermoplastic resin composition obtained as mentioned above. With respect to the obtained microporous film, measurement of the film thickness, the porosity, the air permeability, the puncture strength, and the film rupture temperature were carried out, and the results were shown in Table 1.

Example 12

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in a first zone to a third zone: 115° C., temperature in a fourth zone: 130° C.) in the same direction using a multi-stage stretching machine that can change the stretch temperature in the four zones (the first, second, third, and fourth zones in order are distinguished from the initial stage to the final stage)). Thus, the stretched film of the step (D) was obtained. Further, the stretched film of the step (D) was subjected to 20% thermal relaxation at 130° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 13

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 145° C.) in the same direction using the same multi-stage stretching machine as that in Example 12. Thus, the stretched film of the step (D) was obtained. Further, the stretched film of the step (D) was subjected to 20% thermal relaxation at 145° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 14

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the fourth zone: 115° C.) in the same direction using the same multi-stage stretching machine as that in Example 12. Thus, the stretched film of the step (D) was obtained. Further, the stretched film of the step (D) was subjected to 20% thermal relaxation at 130° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 15

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone: 130° C., temperature in the second zone to the fourth zone: 115° C.) in the same direction using the same multi-stage stretching machine as that in Example 12. Thus, the stretched film of the step (D) was obtained. Further, the stretched film of the step (D) was subjected to 20% thermal relaxation at 130° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 16

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 130) in the same direction using the same multi-stage stretching machine as that in Example 12. Thus, the stretched film of the step (D) was obtained. Further, the stretched film of the step (D) was subjected to 10% thermal relaxation at 130° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 17

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 130° C.) in the same direction using the same multi-stage stretching machine as that in Example 12. Thus, a microporous film not subjected to the step (E) was obtained. With respect to the obtained microporous film, the film thickness, the porosity, the air permeability, the thermal shrinkage rate, and the film rupture temperature were measured as mentioned above. Table 2 shows the results.

Example 18

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 130° C.) in the same direction using the same multi-stage stretching machine as that in Example 12. Thus, the stretched film of the step (D) was obtained. Further, the stretched film of the step (D) was subjected to 20% thermal relaxation at 90° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 19

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 130° C.) in the same direction using the same multi-stage stretching machine as that in Example 12. Thus, the stretched film of the step (D) was obtained. Further, the second stretched film was subjected to 20% thermal relaxation at 170° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Example 20

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 0.15/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature were measured as mentioned above. Table 3 shows the results.

Example 21

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 0.43/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature were measured as mentioned above. Table 3 shows the results.

Example 22

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 0.90/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature were measured as mentioned above. Table 3 shows the results.

Example 23

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 0.05/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature were measured as mentioned above. Table 3 shows the results.

Example 24

The precursor film obtained by the same method as that of Example 4 was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 1.40/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature were measured as mentioned above. Table 3 shows the results.

Example 25

(a) 100 parts by mass of a polypropylene resin, (b) 11 parts by mass of a polyphenylene ether resin, and (c) 3 parts by mass of a compatibilizing agent were used. Using a twin screw extruder set at a temperature of 260 to 320° C. and a screw rotation speed of 300 rpm and having a first material supply port and a second material supply port (located approximately in the center of the extruder), the polyphenylene ether resin was supplied from the first material supply port of the extruder, and the polypropylene resin and the compatibilizing agent were supplied from the second material supply port to the extruder to perform melt kneading. Thus, a thermoplastic resin composition was obtained as pellets.

The pellets of the thermoplastic resin composition obtained as mentioned above was supplied to a single screw extruder set at a screw diameter of 20 mm, L/D=30, and 260° C. through a feeder, and extruded from a T die installed at an end of the extruder and having a lip thickness of 5 mm. Then, the molten resin was immediately exposed to a 25° C. cold air, and taken off at a draw ratio of 200 using a cast roll cooled at 95° C. to form a precursor film.

This precursor film was heat-treated at 150° C. for 3 hours, and uniaxially stretched 1.2 times at a temperature of 25° C. Then, this stretched film was further uniaxially stretched 2.0 times at a temperature of 130° C., and heat set at 145° C. to obtain a microporous film. With respect to the obtained microporous film, the film thickness, the porosity, the air permeability, and the film rupture temperature were measured, and the results were shown in Table 4.

Example 26

A precursor film produced by the same method as that in Example 25 was heat-treated at 140° C. for 3 hours, and uniaxially stretched 1.2 times at a temperature of 25° C. Then, this stretched film was further uniaxially stretched 2.0 times at a temperature of 120° C., and heat set at 145° C. to obtain a microporous film. With respect to the obtained microporous film, the film thickness, the porosity, the air permeability, and the film rupture temperature were measured, and the results were shown in Table 4.

Example 27

A precursor film produced by the same method as that in Example 25 was heat-treated at 130° C. for 3 hours, and uniaxially stretched 1.2 times at a temperature of 25° C. Then, this stretched film was further uniaxially stretched 2.0 times at a temperature of 115° C., and heat set at 145° C. to obtain a microporous film. With respect to the obtained microporous film, the film thickness, the porosity, the air permeability, and the film rupture temperature were measured, and the results were shown in Table 4.

Example 28

A precursor film produced by the same method as that in Example 25 was heat-treated at 130° C. for 3 hours, and uniaxially stretched 1.2 times at a temperature of 25° C. Then, this stretched film was further uniaxially stretched 2.0 times at a temperature of 130° C., and heat set at 145° C. to obtain a microporous film. With respect to the obtained microporous film, the film thickness, the porosity, the air permeability, and the film rupture temperature were measured, and the results were shown in Table 4.

Example 29

A precursor film produced by the same method as that in Example 25 was heat-treated at 120° C. for 3 hours, and uniaxially stretched 1.2 times at a temperature of 25° C. Then, this stretched film was further uniaxially stretched 2.0 times at a temperature of 130° C., and heat set at 145° C. to obtain a microporous film. With respect to the obtained microporous film, the film thickness, the porosity, the air permeability, and the film rupture temperature were measured, and the results were shown in Table 4.

Comparative Example 1

(a) 100 parts by mass of a polypropylene resin, (b) 67 parts by mass of a polyphenylene ether resin, and (c) 17 parts by mass of a compatibilizing agent were used. Using a twin screw extruder set at a temperature of 260 to 320° C. and a screw rotation speed of 300 rpm and having a first material supply port and a second material supply port (located approximately in the center of the extruder), the (b) component was supplied from the first material supply port of the extruder, and the (a) component and the (c) component were supplied from the second material supply port to the extruder to perform melt kneading. Thus, a thermoplastic resin composition was obtained as pellets.

The pellets of the thermoplastic resin composition obtained as mentioned above was supplied to a single screw extruder set at a screw diameter of 20 mm, L/D=30, and 260° C. through a feeder, and extruded from a T die installed at an end of the extruder and having a lip thickness of 3 mm. Then, the molten resin was immediately exposed to a 25° C. cold air, and taken off at a draw ratio of 20 using a cast roll cooled at 95° C. to form a precursor film.

This precursor film was uniaxially stretched (in the MD direction, and the same shall apply hereinafter) 1.2 times at a temperature of 25° C. Then, this stretched film was further uniaxially stretched (in the MD direction, and the same shall apply hereinafter) 2.0 times at a temperature of 150° C., and heat set at 170° C. to obtain a microporous film. With the obtained microporous film, SEM observation and measurement of the mean porosity size, the film thickness, the porosity, the air permeability, the puncture strength, the film resistance, and the film rupture temperature were carried out, and the results were shown in Table 1.

Figure 4:
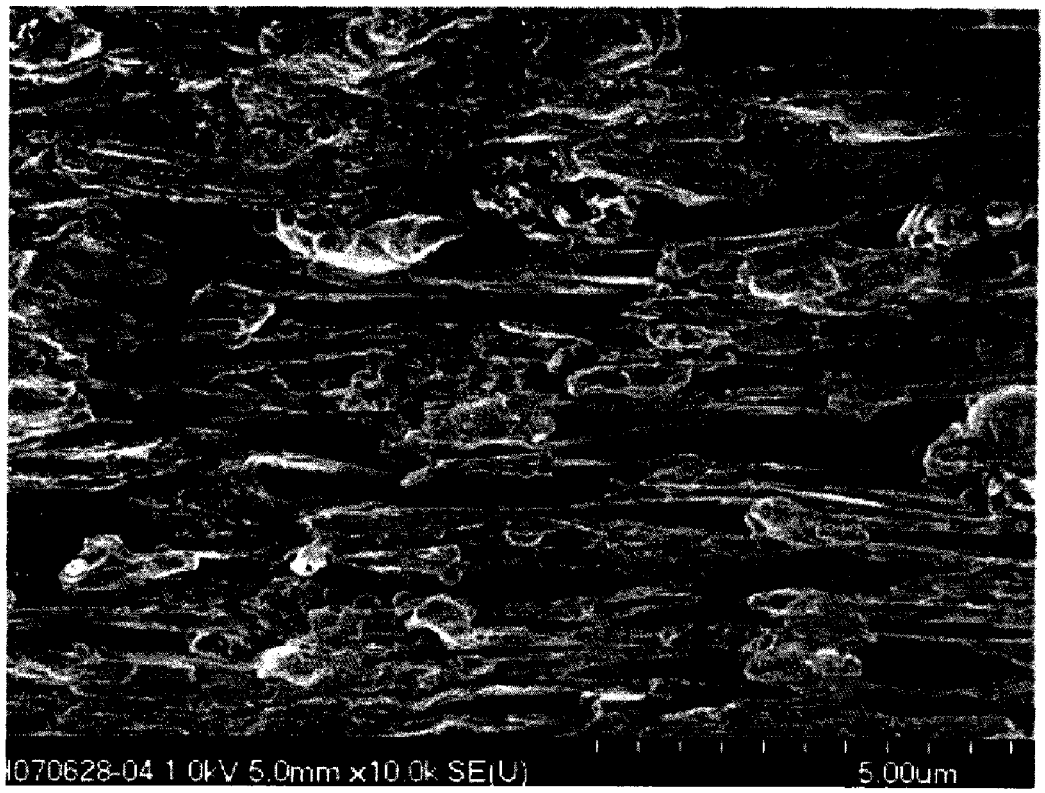
FIG. 4 is an SEM image of a microporous film according to Comparative Example 1.

The SEM image (at a magnification of 10,000) of the obtained microporous film was shown in FIG. 4. FIG. 4 shows that only the pores formed at an interface between the sea portion and the island portion exist in the microporous film obtained in Comparative Example 1.

Comparative Example 2

In Example 12, a precursor film was obtained by the same method as that in Example 12 except that (a) 100 parts by mass of a polypropylene resin was used for the raw material pellet for the precursor film. This precursor film was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, temperature in the first zone to the third zone: 115° C., temperature in the fourth zone: 130° C.) in the same direction using the same multi-stage stretching machine as that in Example 12. Thus, the stretched film of the step (D) was obtained. Further, the stretched film of the step (D) was subjected to 20% thermal relaxation at 130° C. in the same direction. Thus, a microporous film was obtained. With respect to the obtained microporous film, the film thickness, the porosity, the air permeability, the thermal shrinkage rate, and the film rupture temperature were measured as mentioned above. Table 2 shows the results.

Comparative Example 3

In Example 20, a precursor film was obtained by the same method as that in Example 20 except that (a) 100 parts by mass of a polypropylene resin was used for the raw material pellet for the precursor film. This precursor film was heat-treated at 130° C. for 2 hours. Then, the precursor film was uniaxially stretched (stretch ratio: 1.3 times) in the longitudinal direction thereof at a temperature of 25° C., and the stretched film of the step (C) was obtained. Then, the stretched film of the step (C) was further uniaxially stretched (stretch ratio: 2.0 times, strain rate: 0.43/sec) in the same direction at a temperature of 110° C., and the stretched film of the step (D) was obtained. Further, the stretched film of the step (D) was heat set at 130° C. to obtain a microporous film. With respect to the obtained microporous film, the film thickness, the porosity, the air permeability, the thermal shrinkage rate, and the film rupture temperature (breaking resistance) were measured as mentioned above. Table 3 shows the results.

Comparative Example 4

In Example 25, a precursor film was obtained by the same method as that in Example 25 except that (a) 100 parts by mass of a polypropylene resin was used for the raw material pellet for the precursor film. With respect to the obtained microporous film, the film thickness, the porosity, the air permeability, and the film rupture temperature were measured, and the results were shown in Table 4.

TABLE 1

| | | | Ex. 1 | Ex. 2 | Ex. 3 | Ex. 4 | Ex. 5 | Ex. 6 |
|---|---|---|---|---|---|---|---|---|
| Raw material composition | Polypropylene resin | (Part by mass) | 100 | 100 | 100 | 100 | 100 | 100 |
| | Polyphenylene ether resin | | 67 | 43 | 25 | 11 | 11 | 11 |
| | Compatibilizing agent | | 17 | 12 | 7 | 3 | 3 | 3 |
| | Inorganic particulates | | 0 | 0 | 0 | 0 | 0 | 0 |
| | Draw ratio in step (A) | | 150 | 150 | 150 | 150 | 40 | 20 |
| | Treatment temperature in step (B) (° C.) | | 130 | 130 | 130 | 130 | 130 | 130 |
| | Stretch temperature in step (D) (° C.) | | 115 | 115 | 115 | 115 | 115 | 115 |
| | Pore structure according to SEM observation | | (2) | (2) | (2) | (2) | (2) | (2) |
| | Mean porosity size (μm) | | 0.08 | 0.09 | 0.11 | 0.12 | — | 0.60 |
| Basic physical properties | Film thickness (μm) | | 20 | 20 | 19 | 18 | 28 | 34 |
| | Porosity (%) | | 50 | 50 | 49 | 49 | 35 | 35 |
| | Air permeability (sec/100 cc) | | 350 | 320 | 280 | 250 | 2000 | 1500 |
| | Film resistance ($\Omega \cdot cm^2$) | | 2.00 | 2.00 | 1.90 | 1.80 | 3.50 | 3.00 |
| | Puncture strength (N) | | 2.50 | 2.70 | 2.90 | 3.00 | 4.00 | 4.00 |
| | Film rupture temperature | 150° C. | ∘ | ∘ | ∘ | ∘ | ∘ | ∘ |
| | | 175° C. | ∘ | ∘ | ∘ | ∘ | ∘ | ∘ |
| | | 200° C. | ∘ | ∘ | ∘ | ∘ | ∘ | ∘ |

TABLE 1-continued

|  |  |  | Ex. 7 | Ex. 8 | Ex. 9 | Ex. 10 | Ex. 11 | Com. Ex. 1 |
|---|---|---|---|---|---|---|---|---|
| Raw material composition | Polypropylene resin | (Part by mass) | 100 | 100 | 100 | 100 | 100 | 100 |
|  | Polyphenylene ether resin |  | 11 | 11 | 11 | 11 | 11 | 67 |
|  | Compatibilizing agent |  | 3 | 0 | 3 | 0 | 3 | 17 |
|  | Inorganic particulates |  | 0 | 0.07 | 0.07 | 0 | 0 | 0 |
|  | Draw ratio in step (A) |  | 150 | 150 | 150 | 150 | 150 | 20 |
|  | Treatment temperature in step (B) (° C.) |  | 90 | 130 | 130 | 130 | 130 | — |
|  | Stretch temperature in step (D) (° C.) |  | 115 | 130 | 130 | 130 | 130 | 150 |
|  | Pore structure according to SEM observation |  | (2) | (2) | (2) | (2) | (2) | (1) |
|  | Mean porosity size (μm) |  | 0.05 | 0.15 | 0.12 | 0.14 | 0.05 | — |
| Basic physical properties | Film thickness (μm) |  | 25 | 19 | 19 | 20 | 20 | 22 |
|  | Porosity (%) |  | 40 | 52 | 51 | 52 | 51 | 55 |
|  | Air permeability (sec/100 cc) |  | 1000 | 210 | 220 | 300 | 310 | 350 |
|  | Film resistance (Ω·cm²) |  | 2.50 | 2.00 | 1.60 | 2.10 | 2.10 | 4.00 |
|  | Puncture strength (N) |  | 3.50 | 2.10 | 3.20 | 1.90 | 3.20 | 1.50 |
| Film rupture temperature | 150° C. |  | ○ | ○ | ○ | ○ | ○ | ○ |
|  | 175° C. |  | ○ | ○ | ○ | ○ | ○ | ○ |
|  | 200° C. |  | ○ | ○ | ○ | ○ | ○ | ○ |

TABLE 2

|  |  | Ex. 12 | Ex. 13 | Ex. 14 | Ex. 15 | Ex. 16 | Ex. 17 | Ex. 18 | Ex. 19 | Com. Ex. 2 |
|---|---|---|---|---|---|---|---|---|---|---|
| Stretch temperature in step (D) (° C.) | Zone 1 | 115 | 115 | 115 | 130 | 115 | 115 | 115 | 115 | 115 |
|  | Zone 2 | 115 | 115 | 115 | 115 | 115 | 115 | 115 | 115 | 115 |
|  | Zone 3 | 115 | 115 | 115 | 115 | 115 | 115 | 115 | 115 | 115 |
|  | Zone 4 | 130 | 145 | 115 | 115 | 130 | 130 | 130 | 130 | 130 |
| Step (E) | Temperature (° C.) | 130 | 145 | 130 | 130 | 130 | — | 90 | 170 | 130 |
|  | Relaxation (%) | 20 | 20 | 20 | 20 | 10 | — | 20 | 20 | 20 |
| Basic physical properties | Film thickness (μm) | 20 | 20 | 20 | 20 | 20 | 20 | 20 | 20 | 20 |
|  | Porosity(%) | 50 | 52 | 47 | 43 | 52 | 50 | 44 | 35 | 43 |
|  | Air permeability (sec/100 cc) | 300 | 350 | 400 | 500 | 250 | 400 | 540 | 950 | 450 |
|  | Thermal shrinkage rate (%) | 5.0 | 2.0 | 7.0 | 10.0 | 10.0 | 40.0 | 35.0 | 20.0 | 12.0 |
| Film rupture temperature | 150° C. | ○ | ○ | ○ | ○ | ○ | ○ | ○ | ○ | ○ |
|  | 175° C. | ○ | ○ | ○ | ○ | ○ | ○ | ○ | ○ | x |
|  | 200° C. | ○ | ○ | ○ | ○ | ○ | ○ | ○ | ○ | x |

TABLE 3

|  |  | Ex. 20 | Ex. 21 | Ex. 22 | Ex. 23 | Ex. 24 | Com. Ex. 3 |
|---|---|---|---|---|---|---|---|
| Strain rate in step (D) (/sec) |  | 0.15 | 0.43 | 0.90 | 0.05 | 1.40 | 0.43 |
| Basic physical properties | Film thickness(μm) | 20 | 20 | 20 | 20 | 20 | 20 |
|  | Porosity(%) | 55 | 50 | 48 | 46 | 45 | 46 |
|  | Air permeability (sec/100 cc) | 200 | 350 | 400 | 500 | 550 | 520 |
|  | Thermal shrinkage rate (%) | 1.0 | 3.0 | 5.0 | 3.0 | 15.0 | 12.0 |
| Film rupture temperature | 150° C. | ○ | ○ | ○ | ○ | ○ | ○ |
|  | 175° C. | ○ | ○ | ○ | ○ | ○ | x |
|  | 200° C. | ○ | ○ | ○ | ○ | ○ | x |

TABLE 4

|  |  | Ex. 25 | Ex. 26 | Ex. 27 | Ex. 28 | Ex. 29 | Com. Ex. 4 |
|---|---|---|---|---|---|---|---|
| Treatment temperature in step (B) (° C.) |  | 150 | 140 | 130 | 130 | 120 | 150 |
| Stretch temperature in step (D) (° C.) |  | 130 | 120 | 115 | 130 | 130 | 130 |
| Basic physical properties | Film thickness (μm) | 25 | 24 | 26 | 25 | 24 | 25 |
|  | Porosity (%) | 55 | 48 | 48 | 42 | 40 | 48 |
|  | Air permeability (sec/100 cc) | 190 | 310 | 300 | 2800 | 4000 | 450 |
| Film rupture temperature | 150° C. | ○ | ○ | ○ | ○ | ○ | ○ |
|  | 175° C. | ○ | ○ | ○ | ○ | ○ | x |
|  | 200° C. | ○ | ○ | ○ | ○ | ○ | x |

The followings can be read from the results of Tables 1 to 4.

The characteristics of the microporous film according to the present embodiment are:

(1) the microporous film has a good balance between the permeability (porosity and air permeability), the strength, the electric resistance, and the heat shrinkage ratio as a battery separator;

(2) in the case where the microporous film according to the present embodiment is used as a battery separator, the microporous film has a film rupture temperature of not less than 200° C. and drastically improved heat resistance, so that safety with respect to battery shorts (shorts) is significantly improved.

The present application is based on Japanese Patent Application No. 2008-198020, filed on Jul. 31, 2008 to Japan Patent Office, Japanese Patent Application No. 2008-198015, filed on Jul. 31, 2008 to Japan Patent Office, Japanese Patent Application No. 2008-198308, filed on Jul. 31, 2008 to Japan Patent Office, Japanese Patent Application No. 2009-011137, filed on Jan. 21, 2009 to Japan Patent Office, and Japanese Patent Application No. 2009-162876, filed on Jul. 9, 2009 to Japan Patent Office, the subject of which is incorporated herein by reference.

INDUSTRIAL APPLICABILITY

The microporous film according to the present embodiment has industrial applicability as a battery separator, and more specifically, as a separator for lithium ion batteries. In addition, the microporous film according to the present embodiment is used also as various separation films.

| Reference Signs List | |
|---|---|
| 1 | Cell made of SUS |
| 2 | Teflon seal |
| 3 | Spring |
| 4 | Microporous film impregnated with electrolytic solution |
| 5 | Microporous film |
| 6A | Nickel foil |
| 6B | Nickel foil |
| 7A | Glass plate |
| 7B | Glass plate |
| 8 | Electric resistance measuring apparatus |
| 9 | Thermocouple |
| 10 | Thermometer |
| 11 | Data collector |
| 12 | Oven |

The invention claimed is:

1. A microporous film which is made of a thermoplastic resin composition comprising (a) 100 parts by mass of a polypropylene resin and (b) 5 to 90 parts by mass of a polyphenylene ether resin, and which has a sea island structure comprising a sea portion comprising the polypropylene resin as a principal component and an island portion comprising the polyphenylene ether resin as a principal component, wherein pores are formed at an interface between the sea portion and the island portion and within the sea portion.

2. The microporous film according to claim 1, wherein the thermoplastic resin composition further comprises (c) a compatibilizing agent.

3. The microporous film according to claim 1 or 2, wherein a particle size of the island portion is 0.01 to 10 μm.

4. The microporous film according to claim 1 or 2, wherein a mean porosity size as measured with a mercury porosimeter is 0.01 to 0.50 μm.

5. The microporous film according to claim 1 or 2, wherein the thermoplastic resin composition further comprises (d) 0.01 to 0.50 parts by mass of inorganic particulates.

6. A battery separator comprising a microporous film according to claim 1 or 2.

7. A method for producing a microporous film, comprising the steps of (A) to (D) below:
(A) a step of taking off a thermoplastic resin composition in a molten state at a draw ratio of 10 to 300 to obtain a film, the thermoplastic resin composition comprising (a) 100 parts by mass of a polypropylene resin and (b) 5 to 90 parts by mass of a polyphenylene ether resin;
(B) a step of heat-treating the film obtained at the step (A) at a temperature of not less than 100° C. and not more than 160° C.;
(C) a cold stretching step of stretching the film obtained at the step (B) at a temperature of not less than −20° C. and less than 100° C.; and
(D) a hot stretching step of stretching the film obtained at the step (C) at a temperature of not less than 100° C. and less than 170° C.

8. The method for producing a microporous film according to claim 7, further comprising: (E) a thermal relaxation step of thermally relaxing the film obtained at the step (D) at a temperature of not less than 100° C. and less than 170° C.

9. The method for producing a microporous film according to claim 7 or 8, wherein a strain rate during stretching at the step (D) is 0.10 to 1.00/sec.

10. The method for producing a microporous film according to claim 7 or 8, wherein at the step (D), the film obtained at the step (C) is stretched at not less than two different temperature stages.

11. The method for producing a microporous film according to claim 10, wherein the not less than two different temperature stages comprise a temperature of an initial stage of stretching at the step (D) and a temperature of a final stage of stretching at the step (D) higher than the temperature of the initial stage, and the temperature is raised stepwise or gradually from the temperature of the initial stage to the temperature of the final stage.

12. The method for producing a microporous film according to claim 7 or 8, wherein a stretch temperature at the step (D) is lower than a heat treatment temperature at the step (B).

13. The method for producing a microporous film according to claim 8, wherein thermal relaxation at the step (E) is performed at the final stage temperature at the step (D).

* * * * *